Figure 1:
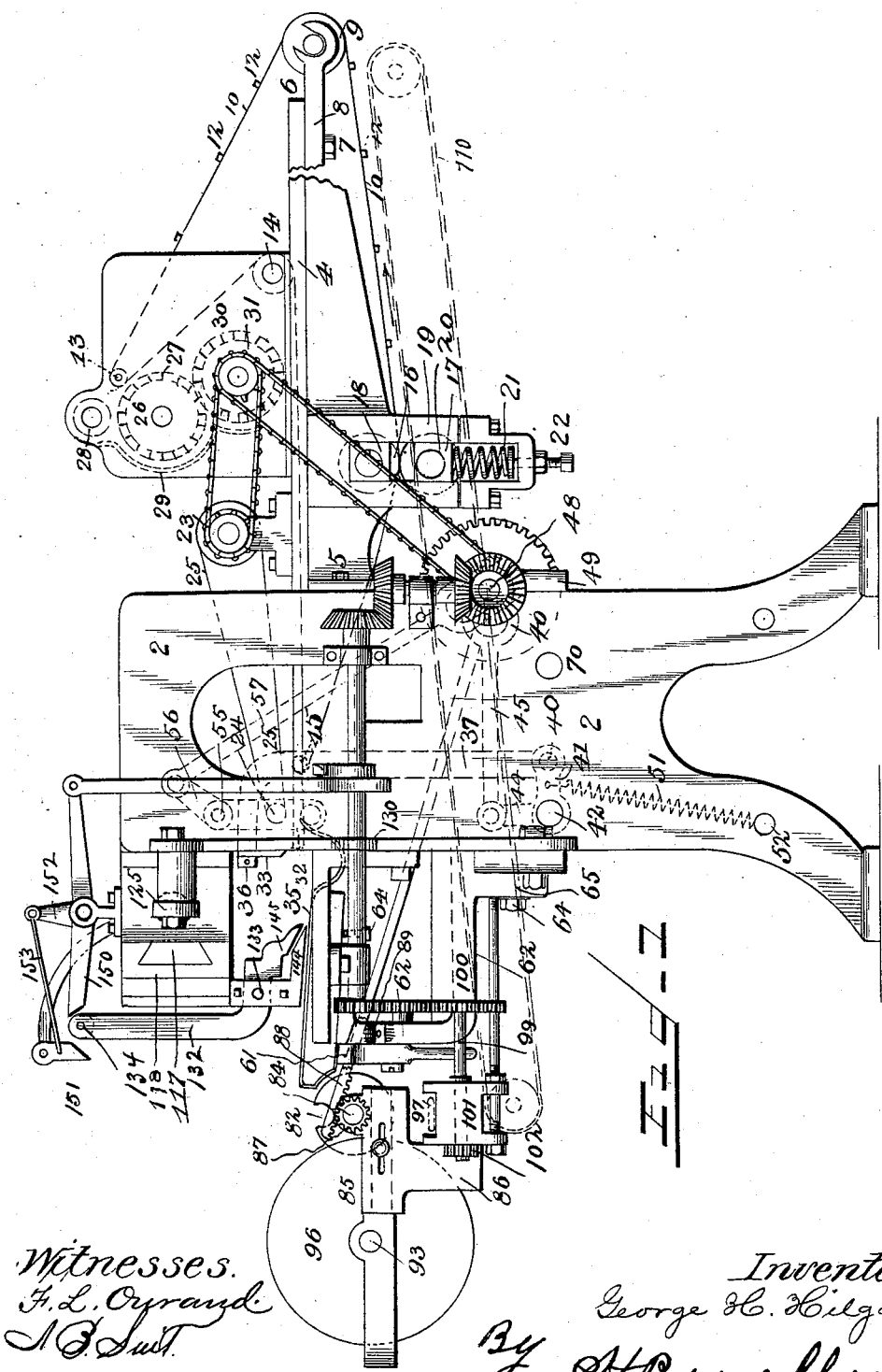

(No Model.) 17 Sheets—Sheet 1.
G. H. HILGARTNER.
CIGARETTE MACHINE.

No. 588,909. Patented Aug. 24, 1897.

Witnesses.
F. L. Ourand
A. S. Swit.

Inventor.
George H. Hilgartner
By H. Bewellson
Attorney (No Model.) 17 Sheets—Sheet 3.
G. H. HILGARTNER.
CIGARETTE MACHINE.

No. 588,909. Patented Aug. 24, 1897.

(No Model.)
G. H. HILGARTNER.
CIGARETTE MACHINE.
No. 588,909. Patented Aug. 24, 1897.
17 Sheets—Sheet 6.
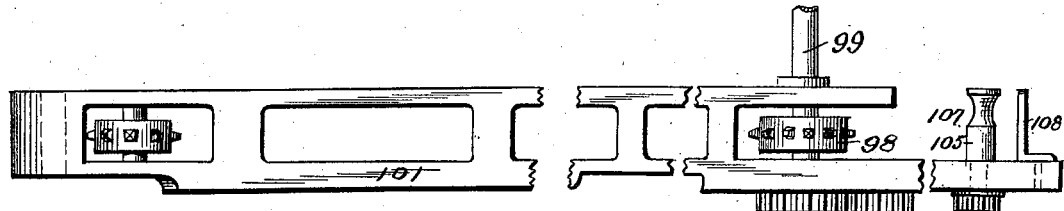
Fig. 6
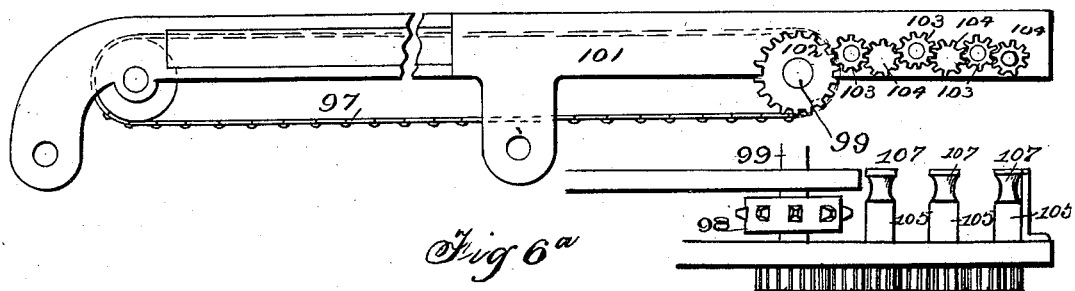
Fig. 6ᵃ
Witnesses.
F. L. Ourand
A. B. Suit
Inventor
George H. Hilgartner
By H. B. Wilson
Attorney.

(No Model.)  
G. H. HILGARTNER.  
CIGARETTE MACHINE.

No. 588,909. Patented Aug. 24, 1897.

Witnesses:  
F. L. Oyraud  
A. S. Sail

Inventor  
George H. Hilgartner  
By H. Bevinson  
Attorney (No Model.)
G. H. HILGARTNER.
CIGARETTE MACHINE.
No. 588,909.
17 Sheets—Sheet 8.
Patented Aug. 24, 1897.
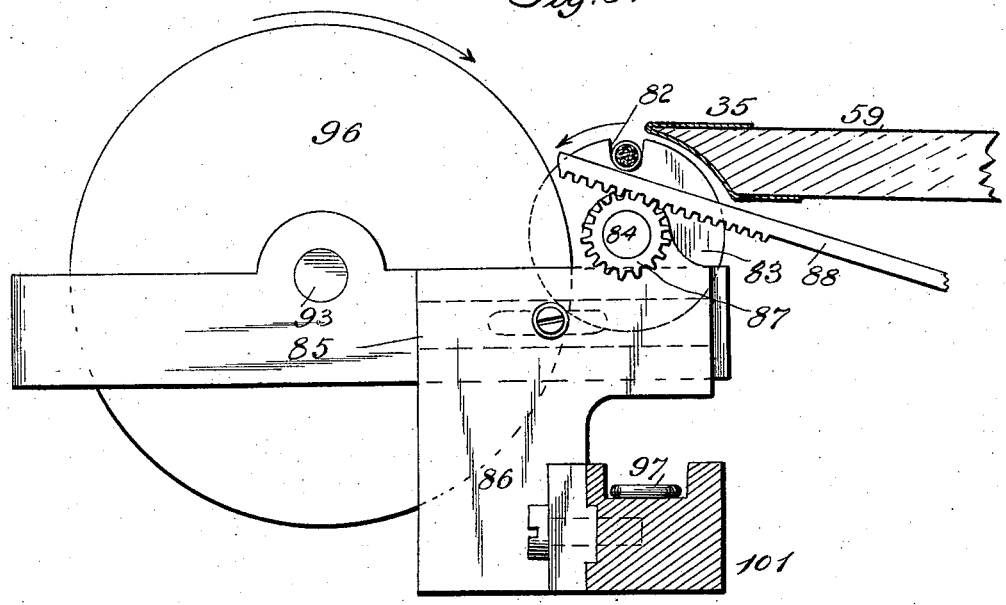
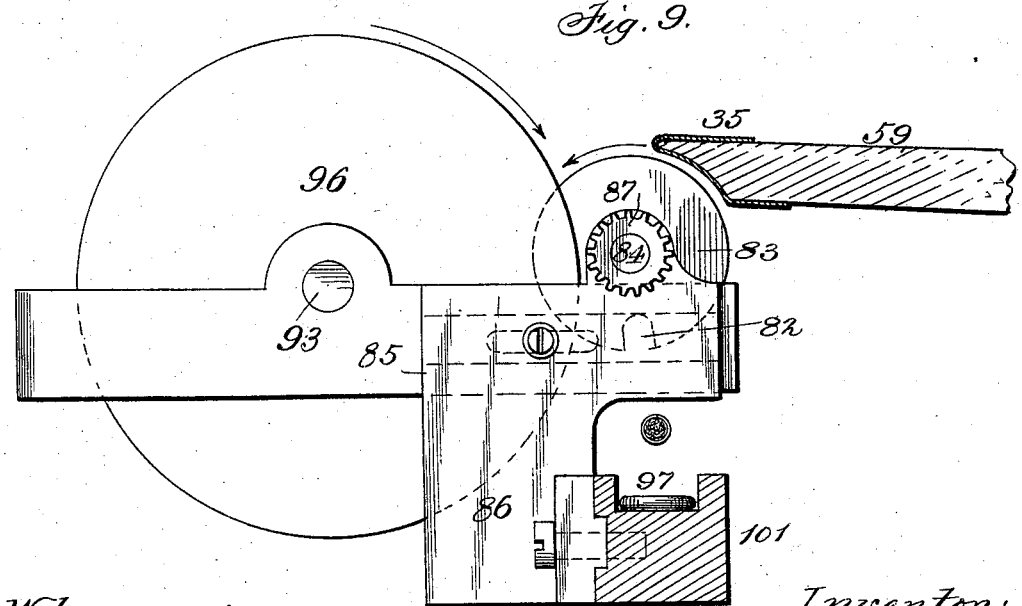

(No Model.) 17 Sheets—Sheet 9.
G. H. HILGARTNER.
CIGARETTE MACHINE.
No. 588,909. Patented Aug. 24, 1897.
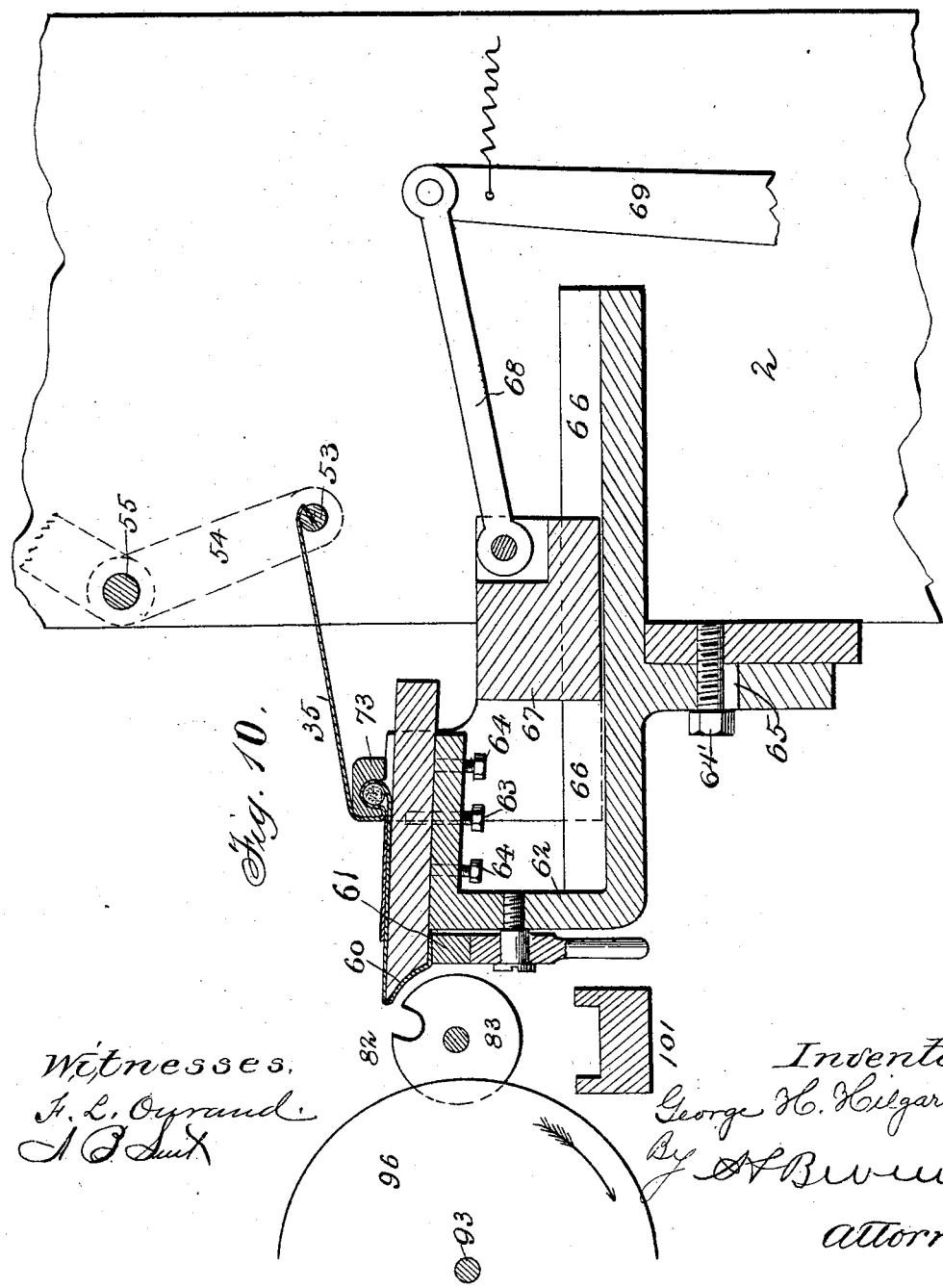

(No Model.) 17 Sheets—Sheet 10.

G. H. HILGARTNER.
CIGARETTE MACHINE.

No. 588,909. Patented Aug. 24, 1897.

Witnesses:

Inventor
George H. Hilgartner
By his Attorney (No Model.)  17 Sheets—Sheet 11.
G. H. HILGARTNER.
CIGARETTE MACHINE.
No. 588,909.  Patented Aug. 24, 1897.
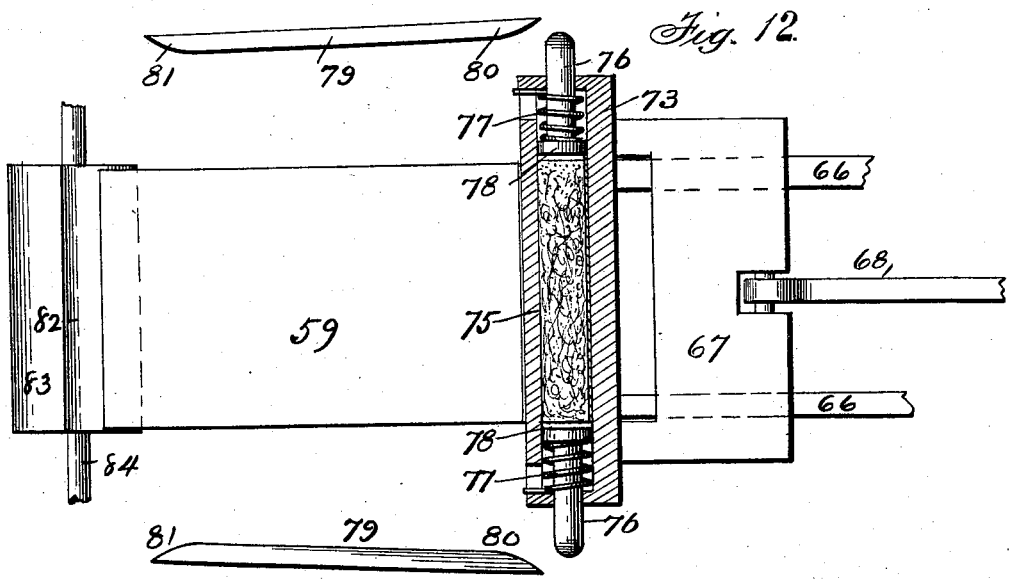
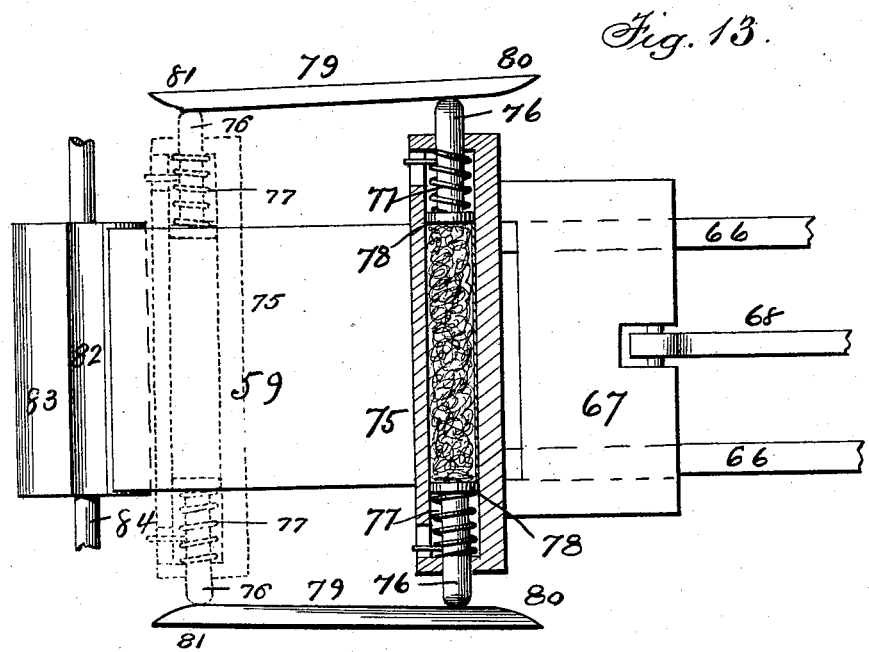
Witnesses:
Franck L. Durand
A. P. Smith
Inventor
George H. Hilgartner
By H. B. Willson
Attorney
THE NORRIS PETERS CO., PHOTO-LITHO., WASHINGTON, D. C.

(No Model.) 17 Sheets—Sheet 12.

G. H. HILGARTNER.
CIGARETTE MACHINE.

No. 588,909. Patented Aug. 24, 1897.

Witnesses.

Inventor
George H. Hilgartner
By H. B. Wilson
Attorney (No Model.)  17 Sheets—Sheet 13.

G. H. HILGARTNER
CIGARETTE MACHINE.

No. 588,909.  Patented Aug. 24, 1897.

Witnesses:
F. L. Durand
A. J. Suil

Inventor
George H. Hilgartner,
By H. Biverson.
Attorney.

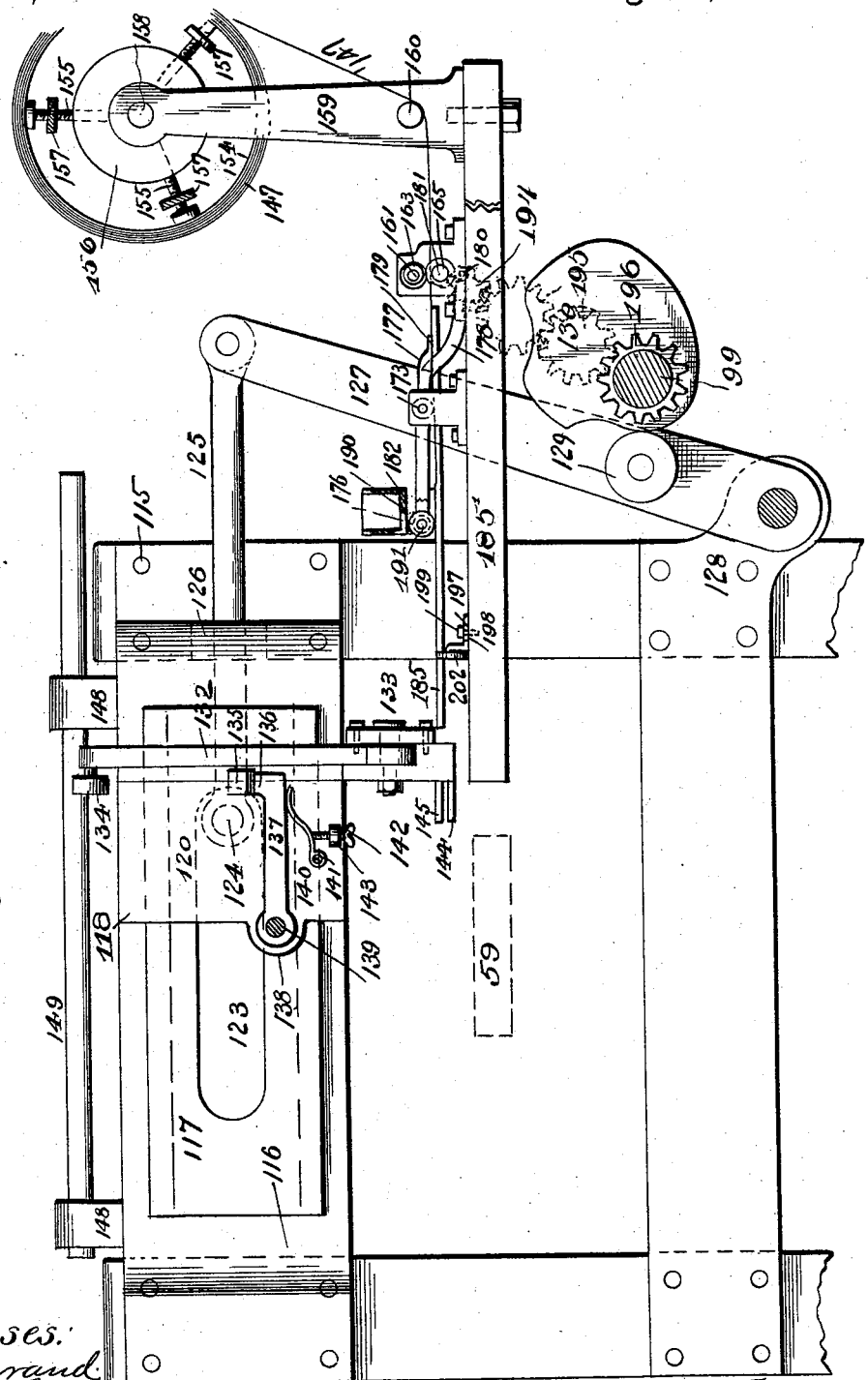

(No Model.)

17 Sheets—Sheet 15.

G. H. HILGARTNER.
CIGARETTE MACHINE.

No. 588,909.  Patented Aug. 24, 1897.

Witnesses:
F. L. Ouraud
A. S. Suit

Inventor:
George H. Hilgartner
By H. Bennison
Attorney.

(No Model.)  
17 Sheets—Sheet 16.
G. H. HILGARTNER.
CIGARETTE MACHINE.
No. 588,909. Patented Aug. 24, 1897.
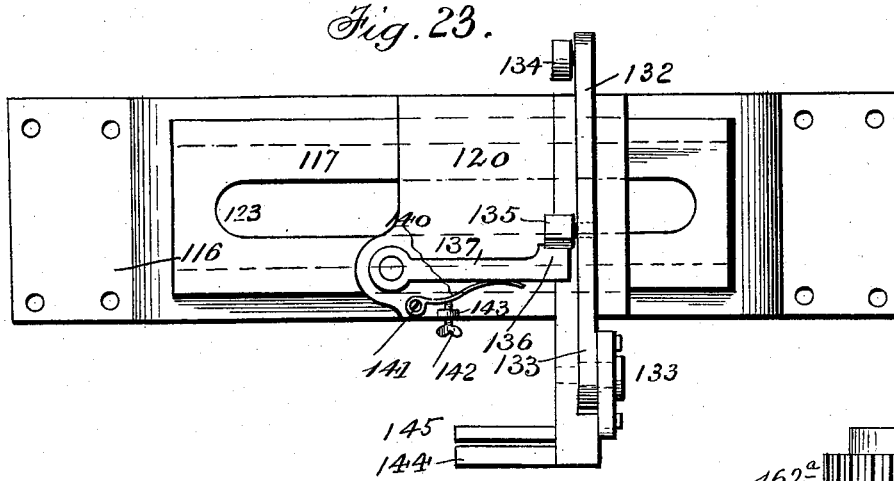
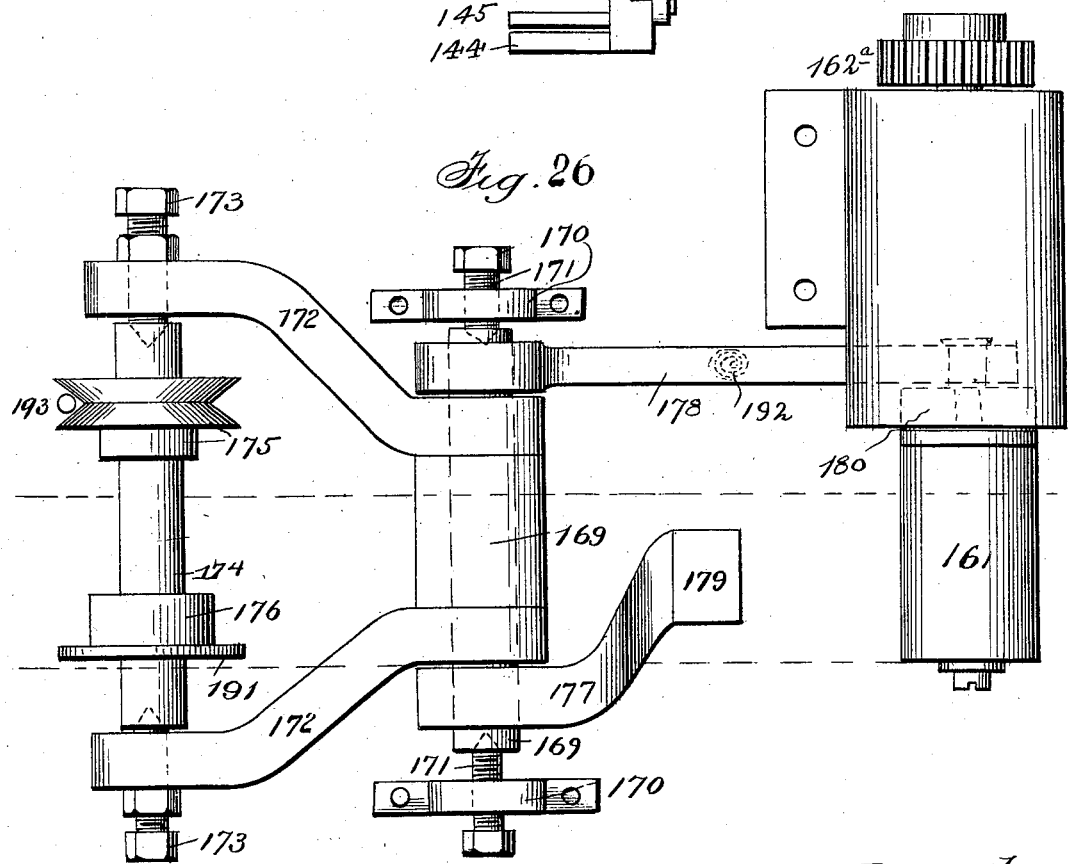

(No Model.)

17 Sheets—Sheet 17.

G. H. HILGARTNER.
CIGARETTE MACHINE.

No. 588,909.

Patented Aug. 24, 1897.

Witnesses:
Franck L. Ourand.
A. B. Suit.

Inventor:
George H. Hilgartner
By
Attorney

UNITED STATES PATENT OFFICE.

GEORGE H. HILGARTNER, OF RICHMOND, VIRGINIA, ASSIGNOR OF ONE-HALF TO WILLIAM HENRY WALKER, OF SAME PLACE.

CIGARETTE-MACHINE.

SPECIFICATION forming part of Letters Patent No. 588,909, dated August 24, 1897.

Application filed March 25, 1896. Serial No. 584,869. (No model.)

*To all whom it may concern:*

Be it known that I, GEORGE H. HILGARTNER, a citizen of the United States, residing at Richmond, in the county of Henrico and State of Virginia, have invented certain new and useful Improvements in Cigarette-Machines; and I do declare the following to be a full, clear, and exact description of the invention, such as will enable others skilled in the art to which it appertains to make and use the same.

My invention has relation to cigarette-machines, and more particularly to that class wherein the filler is first picked and suitably prepared, then slightly pressed and cut into proper lengths and fed to the rolling-table, and the paper cut into suitable lengths with the requisite amount of paste applied to one edge thereof, then wrapped around the filler so that its edges are united and the formed cigarette delivered to the cutter, which trims its ends to the proper length and the finished cigarette delivered to the packers, the operation from beginning to end being accomplished automatically, as above described.

To these ends the novelty consists in the construction, combination, and arrangement of the several parts coöperating to this common end, as will be hereinafter more fully described, and particularly pointed out in the claims.

In the accompanying drawings the same figures and letters of reference indicate the same parts of the invention.

Figure 2:
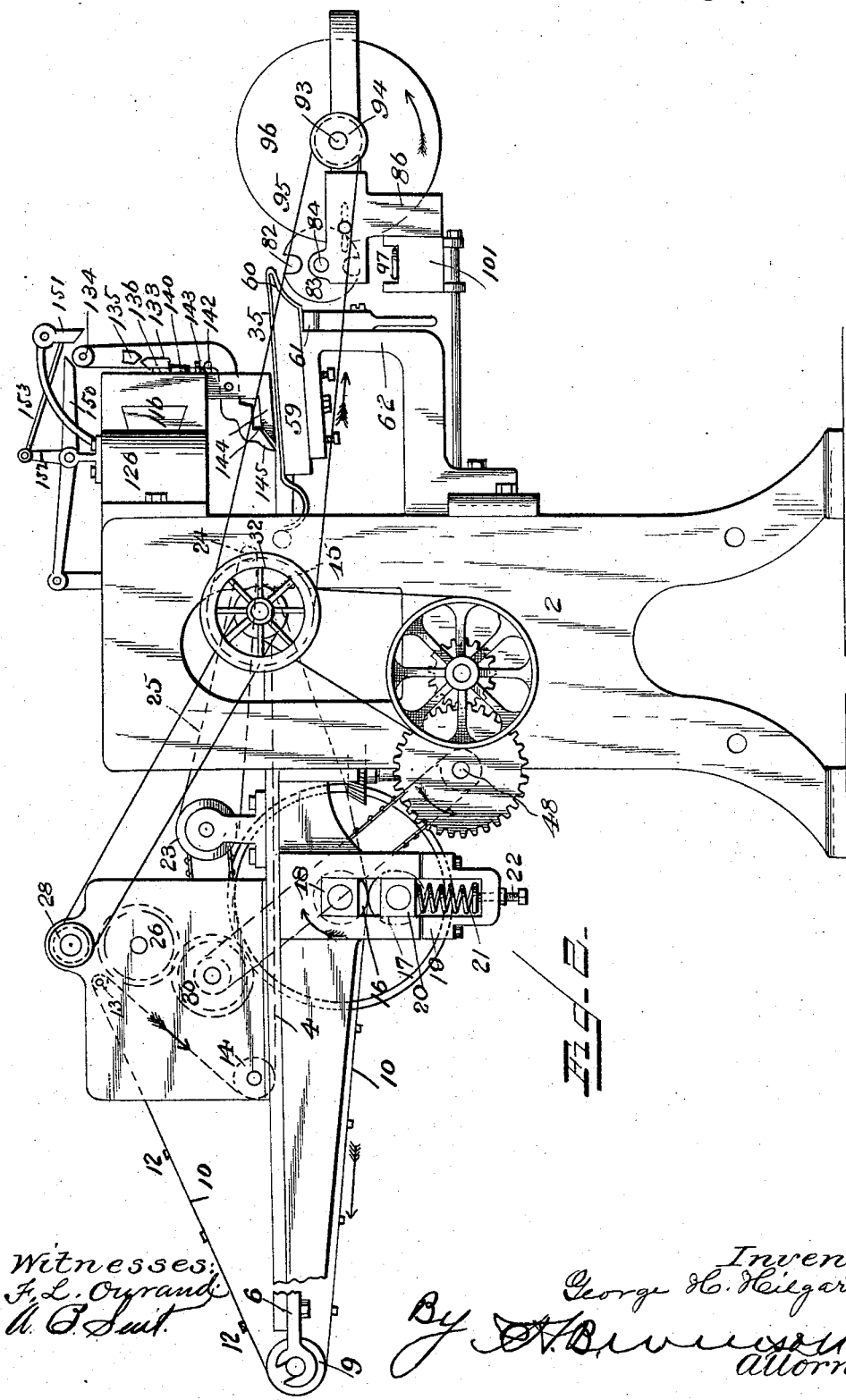
Figure 3:
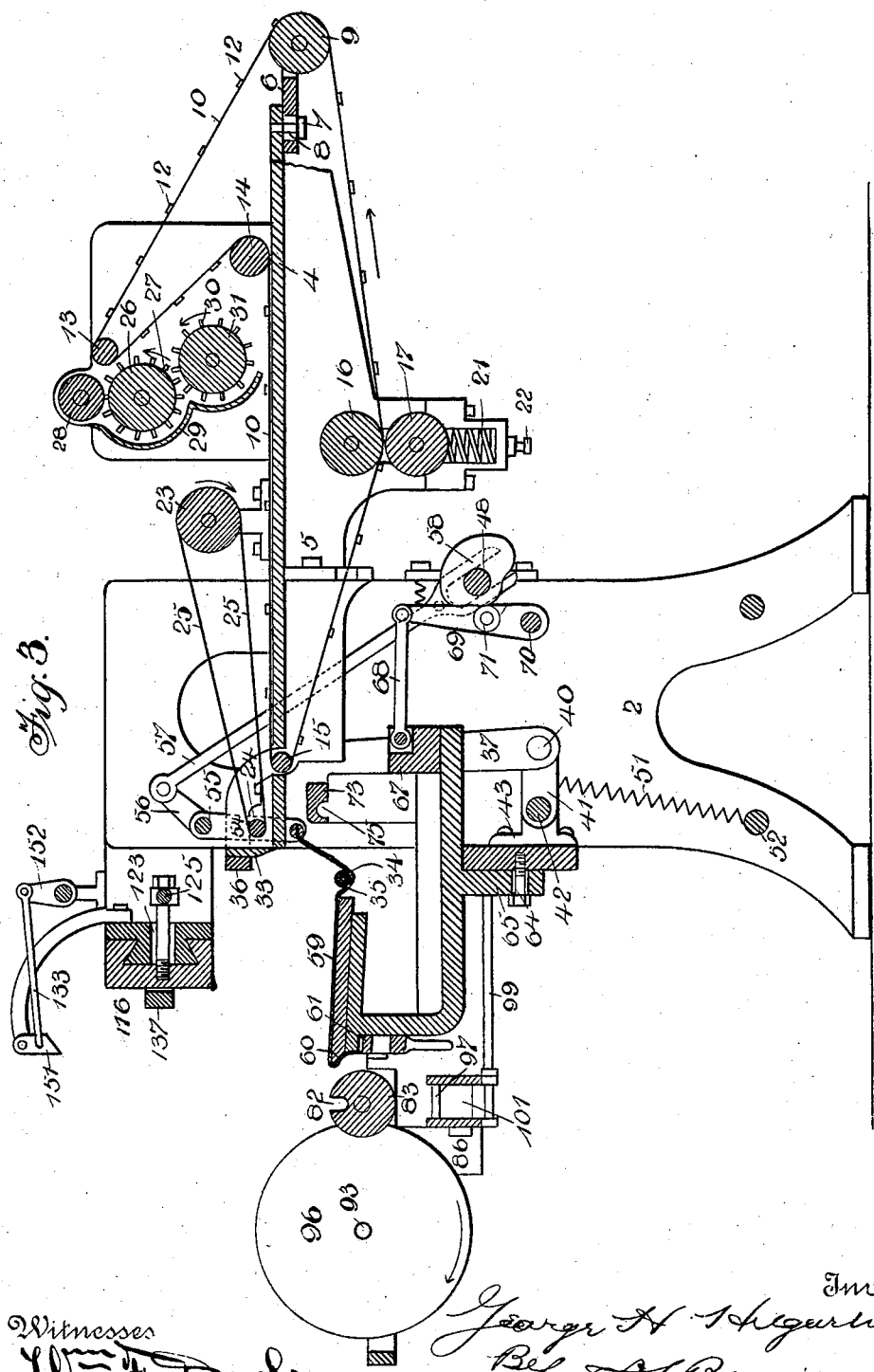
Figure 4:
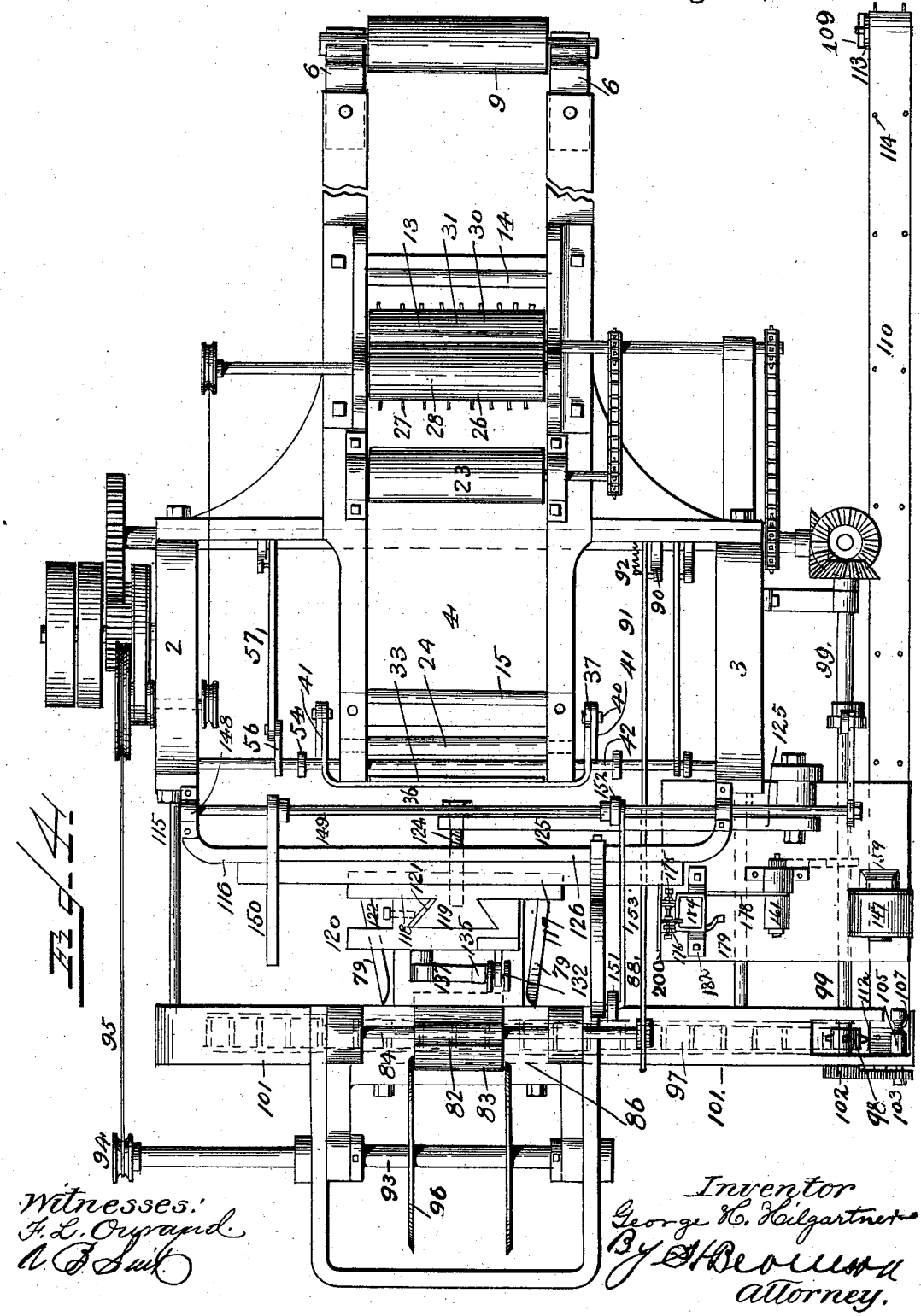
Figure 5:
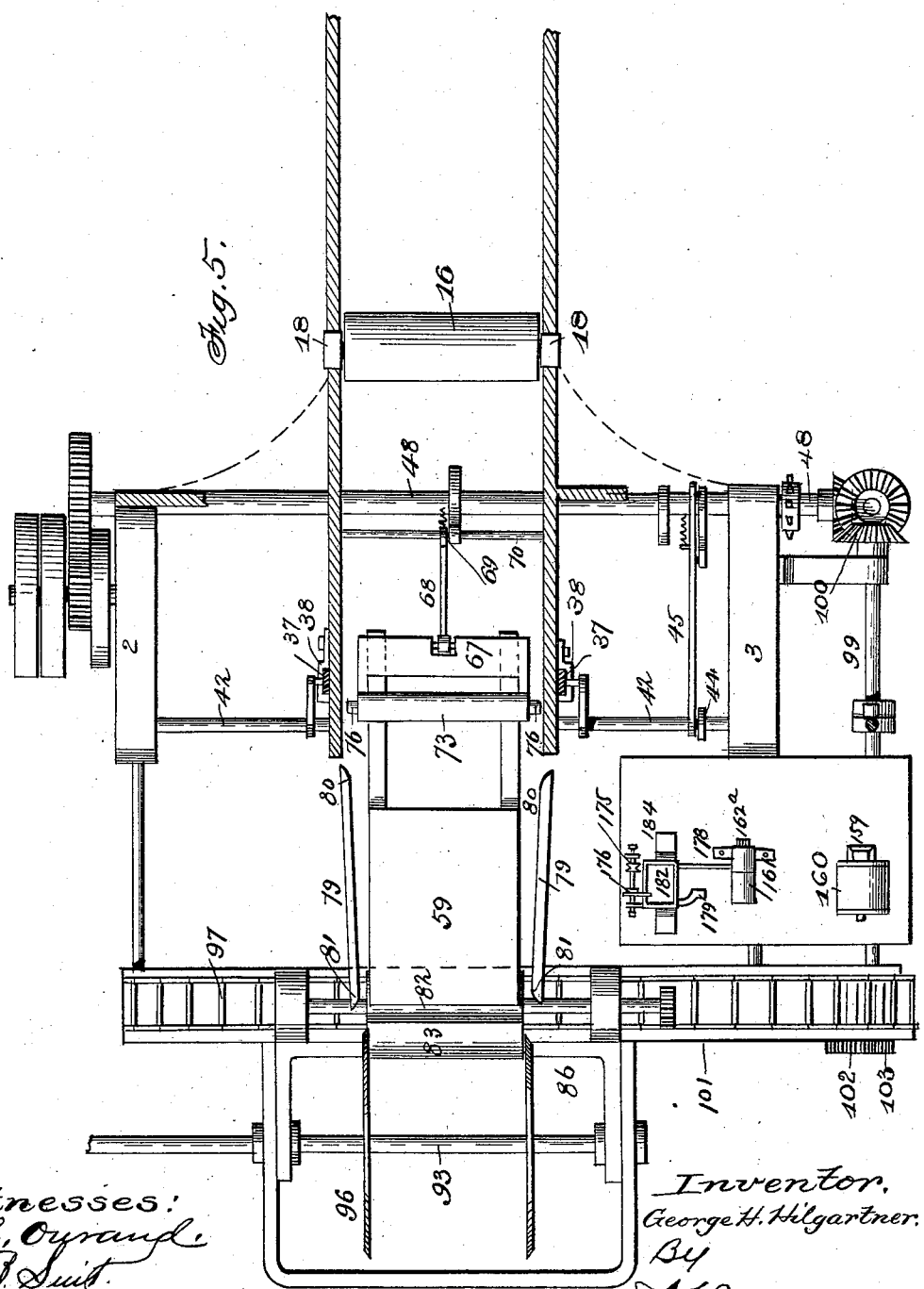
Figure 7:
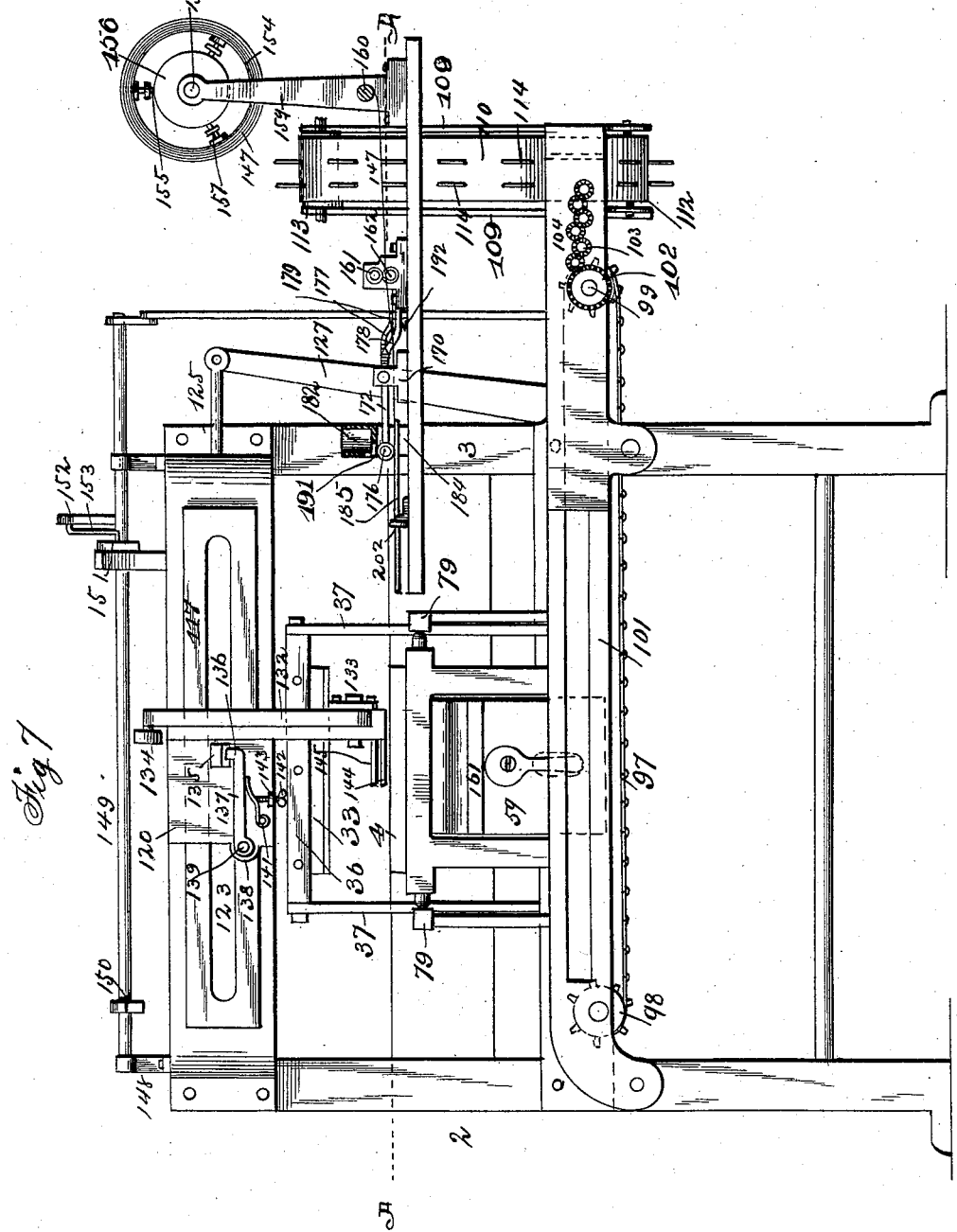
Figure 11:
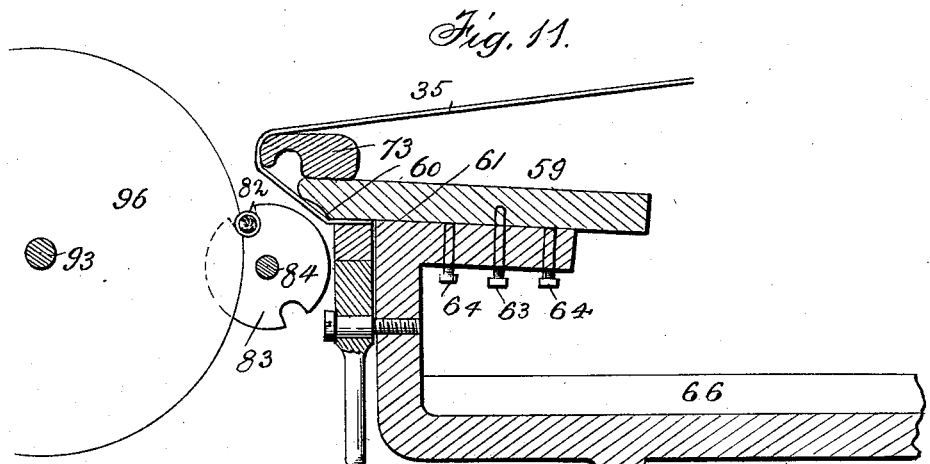
Figures 24, 25:
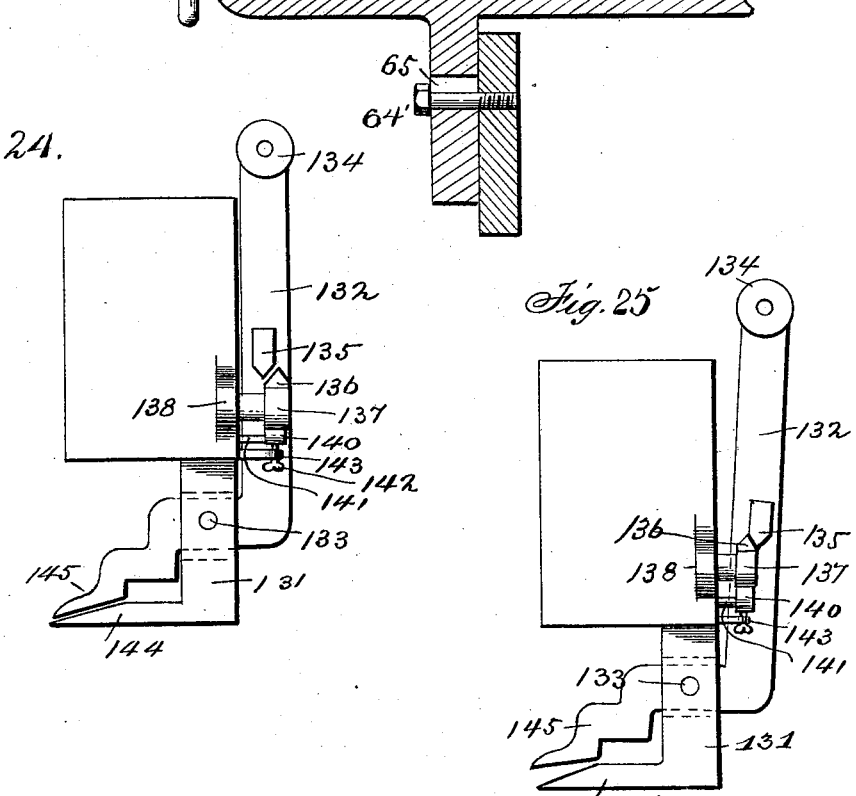
Figure 14:
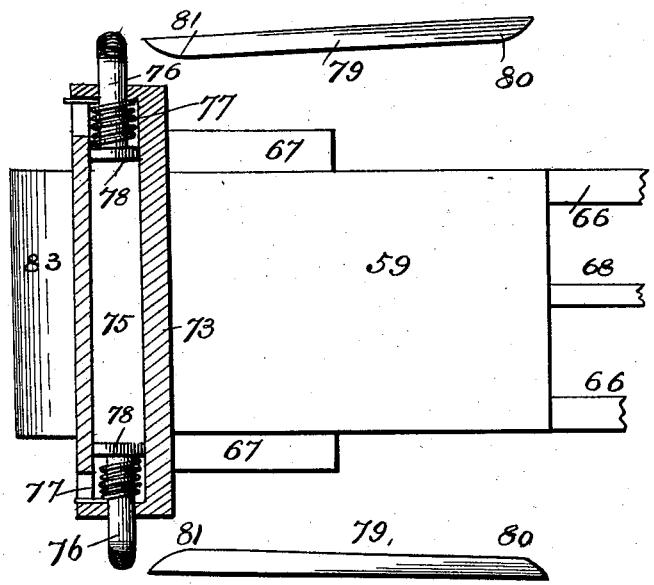
Figure 16:
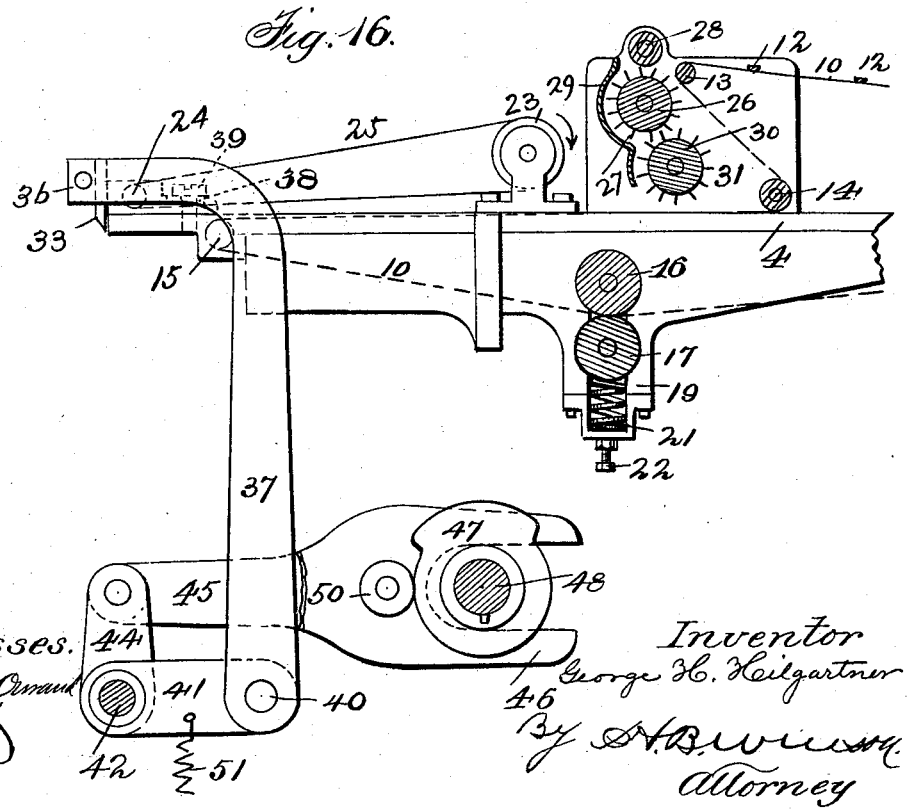
Figure 18:
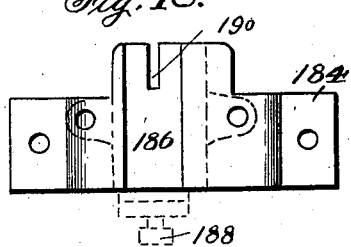
Figure 21:
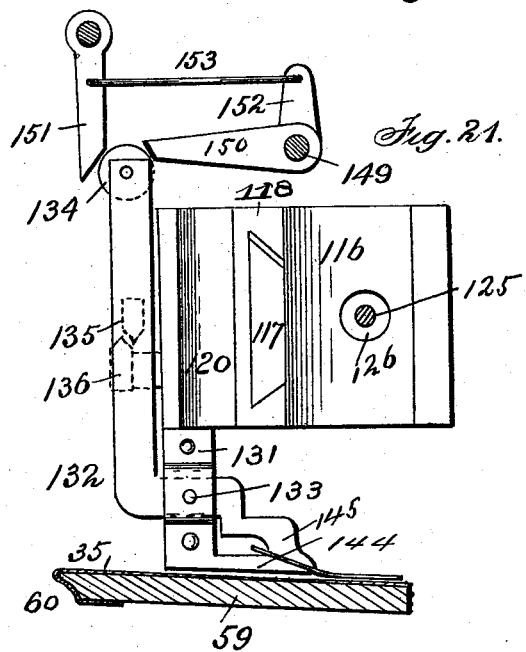
Figure 15:
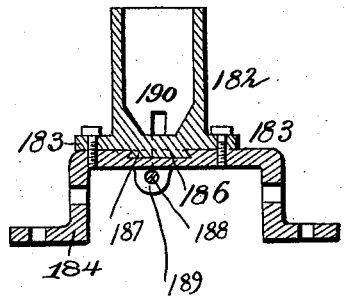
Figure 22:
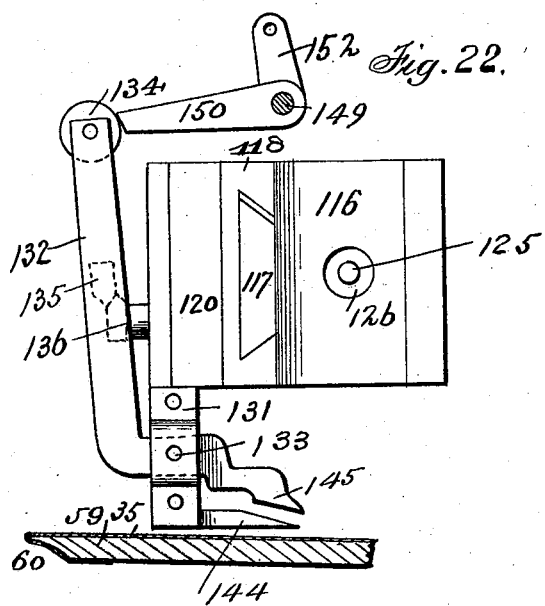
Figure 19:
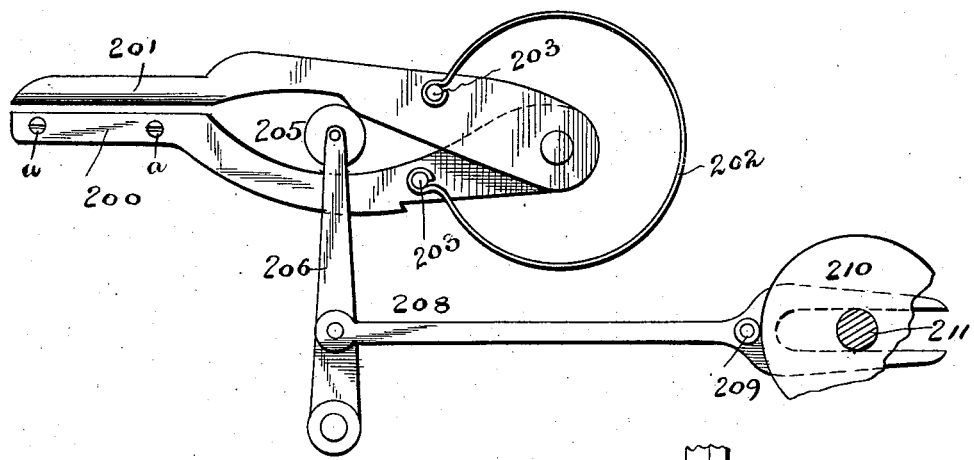
Figure 20:
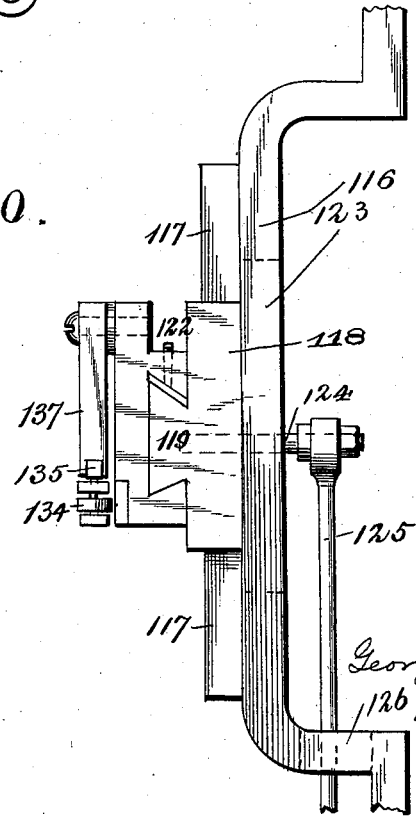
Figure 27:
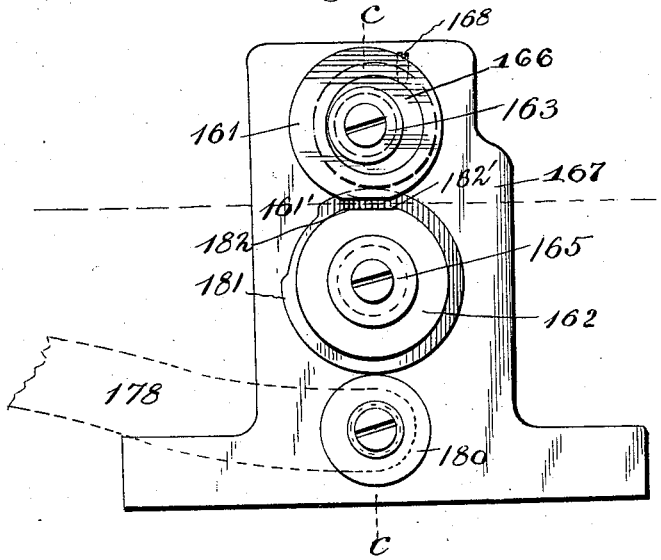
Figure 28:
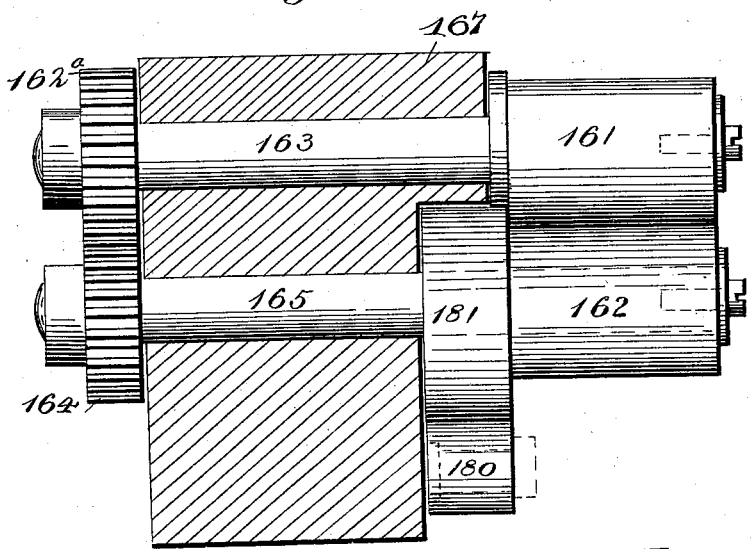

In the drawings, Figure 1 is a side elevation of my improved cigarette-making machine, viewed from the left-hand side thereof. Fig. 2 is a similar view taken from the right-hand side. Fig. 3 is a longitudinal central sectional elevation of the same. Fig. 4 is a top plan view. Fig. 5 is a top plan view on the line A A of Fig. 7. Fig. 6 is a top plan view of the endless-chain carriage. Fig. 6ª is a side view of the same. Fig. 7 is a rear end view of the machine. Fig. 8 is an enlarged detail view of the cigarette-trimming device. Fig. 9 is another view of the same, showing the finished cigarette in the act of being discharged upon the endless carrying-chain. Fig. 10 is an enlarged sectional view showing the cigarette-rolling head engaging the front end of the gummed wrapper. Fig. 11 is a view showing the position of the parts while the ends of the cigarette are being trimmed. Fig. 12 is a horizontal section of the cigarette-rolling head, showing the position of the plungers before the said head has closed the pocket in the apron. Fig. 13 is a similar section of the cigarette-rolling head, showing in dotted lines the final compression of the cigarette. Fig. 14 is a section of the parts mentioned after the plungers are released by the converging rails. Fig. 15 is a longitudinal section of the paste-receptacle and its bracket. Fig. 16 is an enlarged detail view, partly in section, of the main shaft and cam operating the cutting-knife. Fig. 17 is a side elevation, partly in section, of the paper-roll, feeding, tension, pasting, and shearing devices. Fig. 18 is a plan view of the bracket supporting the paste-receptacle. Fig. 19 is a side view of the shears and their operating mechanism. Fig. 20 is a top plan view of the wrapper-conveying mechanism. Fig. 21 is a side elevation of the same, showing the paper-carrying jaws closed with the gummed wrapper between them. Fig. 22 is a similar view showing the jaws open. Fig. 23 is an enlarged rear elevation of the wrapper-conveying head. Fig. 24 is a detail of the wrapper-conveying head, taken opposite to and when the jaws are in the position shown in Fig. 16. Fig. 25 is a detail view of the same, taken on opposite side of and when the jaws are in the position shown in Fig. 17. Fig. 26 is an enlarged plan view of the paper-feeding, tension, and pasting devices. Fig. 27 is a side elevation of the feed-rolls detached from the machine, and Fig. 28 is a section on the line C C of Fig. 27.

The construction of my invention may be described as follows:

The cast metal sides 2 and 3 and the bed-plate 4 constitute the frame of the machine, the plate being firmly secured to the sides by bolts 5. A bracket 6 is adjustably secured to the forward end of the bed-plate 4 by bolts 7, passing through slots 8 in said bracket, and the forward end thereof is bifurcated, so as to receive a roller 9. Starting at this point an endless belt 10, provided at suitable intervals with divisional strips or cross-bars 12, passes obliquely upward over a small roller 13, thence obliquely downward and forward over a roller 14, thence rearward along the bed-plate 4, around a return-roller 15, thence forward between two feed-rollers 16 and 17 to the first roller 9. The journals of the roller 16 are mounted in fixed bearings 18 in the depending brackets 19, bolted underneath the bed-plate 4, and the journals of the lower roller 17 are mounted in adjustable bearings 20, sliding in guideways in said arms 19. These bearings 20 rest upon springs 21, which, through the medium of the roller 17, press the endless belt 10 against the roller 16, the tension of the spring being regulated by thumb-screws 22. A gear on the outside of the shaft of the roller 16 drives it in the direction of the arrow, and it will thus be seen that a continuous motion in the direction indicated by the arrows is imparted to the endless belt 10.

Mounted in the upper part of the side pieces 2 and 3, between them and above the endless belt 10, is a roller 23, driven by a sprocket-wheel 23', connected by a sprocket-chain 23², driven by a sprocket-wheel on the shaft of the picker-cylinder 31 on the outside of the frame, and back of said roller is similarly mounted a smaller roller 24, and upon these rollers 23 24 is secured an endless belt 25, continuously driven by the roller 23 in the direction of the arrows, and the lower face of the endless belt 25 is set at an angle or incline with reference to the endless belt 10, so that the discharge-opening between the rollers 15 and 24 will be contracted or narrower than the receiving-point between the roller 23 and the endless belt at the point immediately beneath it.

The prepared cut or loose tobacco is evenly spread in suitable quantities upon the endless belt 10 and between the dividing-strips 12 at the forward end of the machine. The tobacco is then conveyed by said belt 10 and discharged by gravity upon the picking-roller 26, whence it is caught by the picker-teeth 27 and carried under the solid pressure-roller 28, having a plain surface, around which it is prevented from being thrown off by the sheet-metal guard 29. The tobacco is then taken off of the picking-roller 26 by the teeth 30 on the lower-picking roller 31, which is in a different plane with the teeth 27 on the cylinder 26, and the points of the teeth 30 project beyond the periphery of the teeth 27 and pick the tobacco off from said teeth 27, carry it around below the lower portion of the guard 29, and discharge it evenly upon the endless apron 10. The upper picking-roller 26 revolves in a comparatively slow motion in the direction of the arrow, while the lower picker-roller 31 revolves in the direction of the arrow much more rapidly, which effectually picks or "gins off" the tobacco from the upper roller and discharges it evenly and regularly upon the endless belt, as above mentioned. The tobacco as thus received upon the endless belt 10 is conveyed rearward into the conveying-passage formed by the belts 10 and 25 and gradually compressed as it is carried back to the discharge-opening between the rollers 15 and 24, where it is discharged upon the cutting-off shelf 32, where its end is stopped by and it is further compressed against the face of the cutter-blade 33. At a suitable moment the cutter-blade 33 is raised and the tobacco then continues its movement rearward until sufficient tobacco has been fed outward. At this moment the blade 33 descends, cuts off the charge into the pocket 34, formed in the front end of the apron 35. This cutter-blade 33 is rigidly secured in the outer ends 36 of two vertically-reciprocating arms 37, located on each side of the base-plate 4 and between it and the inside of the sides 2 and 3, where they travel in two guide-brackets 38, adjustably secured to the inside of said sides 2 and 3 by bolts 39, (shown in Fig. 16,) so that the arms 37, and thereby the blade 33, may be adjusted with reference to its cutting edge. The lower ends of these arms 37 are hinged upon a transverse rod 40, which in turn is hinged by a pair of levers 41 to a rock-shaft 42, journaled in brackets 43, cast integral with the sides 2 and 3. The levers 41 are rigidly secured to either end of the rock-shaft 42, and between them and at approximately a right angle thereto is rigidly secured a lever 44, to the upper end of which is connected one end of the forked connecting-rod 45, the forked end 46 of which encompasses the shaft 48, and a cam 47 is rigidly secured upon and rotates with this main driving-shaft 48, which is mounted in bearings 49 in the front end of the sides 2 and 3.

On the forked end 46 of the rod 45 and on one side thereof is journaled a friction-roller 50, against which the face of the cam 47 presses to raise the cutter-blade 33, and the roller 50 is held against the cam 47 in its return movement, which is the downward or cutting movement of the blade 33, by a spiral spring 51, one end of which is secured to the lever 41 and the other end to a bolt 52, secured at a suitable point on one of the sides 2, and the tension of this spring is so adjusted that while it will readily cut off the required charge of tobacco the motion of the cutter-blade will be arrested and injury to its edge prevented should small particles of metal, such as nails, tacks, or the like become accidently mixed in with the cut tobacco.

The charge, being severed from the main body of the tobacco by the blade 33, falls by gravity into the pocket 34 of the apron 35. One end of this apron 35 is clamped longitudinally in a divided rod 53, which is rigidly secured at its ends in the lower ends of a pair of arms 54, rigidly secured to and depending from an oscillating shaft 55, journaled in the sides 2 and 3, and similarly secured to said shaft 55 is an upwardly-projecting lever 56, the free end of which is connected to a pitman 57, the forked end of which engages a cam 58, secured to the main shaft 48. This pitman and its operating-cam are similar in construction to the forked rod 45 and cam 48 above described, and consequently the description of the one will answer for the other. The forward end of the apron 35 being secured to the divided rod 53, as before mentioned, the rod is now moved toward the cigarette-rolling table, whereby sufficient slack is allowed to form the pocket 34. The apron then extends rearward, resting upon the cigarette-rolling table, passing around the beveled end 60 thereof, and having its end secured to the under side thereof by a clamp 61.

When the cam 58 operates to carry the divided rod 53 toward the cigarette-rolling table, the cigarette-rolling head 73 closes the pocket in the apron with the charge of tobacco in it, and as soon as the cigarette-rolling head 73 enters on its journey on the cigarette-rolling table the divided rod 53, to which one end of the apron is attached, is moved away from the table by its cam 58 a sufficient distance to draw the apron snugly around the charge of tobacco, which it encompasses within the cigarette-rolling head 73, and the further movement of the said cigarette-rolling head rolls the charge of tobacco over and over, ready to receive the wrapper, as will be hereinafter explained.

The table 59 is adjustably secured to a bracket 62, so that its discharge end 60 will be slightly higher than its receiving end, (the drawings showing a somewhat exaggerated inclination,) whereby in the operation of forming the cigarette it is practically rolled "uphill." The object of this is to retain the loose tobacco in the roll and prevent it from falling ahead of the roll by gravity and covering the paste end of the paper, thereby overcoming a very serious objection in that class of machines using a segmental table.

The bracket 62 is adjustably secured to lugs on the sides 2 and 3 by bolts 64', passing through vertical slots 65, and by means of this construction the table 59 may be raised or lowered at will. This bracket 62 is provided with an integral guide 66, upon which a rolling-carriage 67 slides, the said carriage being reciprocated by a pitman 68, connected to a lever 69, the lower end of which is hinged to a shaft 70, secured between the sides 2 and 3, and this lever is provided with a friction-roller 71, which comes in contact with a suitably-shaped cam 72, secured to the main shaft 48, which operates the carriage as follows: The parts being in the position shown in Fig. 2 and the charge of tobacco having fallen into the pocket in the apron, the cam 72 forces the carriage backward until its cigarette-rolling head 73 is about midway the length of the table 59, where it stops for a brief interval, as will be hereinafter explained. It then continues its movement to the end 60 of the table, which is its limit in one direction. The cam 72 then releases it, and a spring 74, secured at one end to the lever 69 and at the other to the frame, restores the carriage at one continuous movement to its first position.

I will now proceed to describe the particular construction of the cigarette-rolling head 73 of the carriage 67.

Referring to Fig. 12, the cigarette-rolling head 73 is provided with an inverted semicircular recess 75, which is a trifle longer than the length of the cigarette, and at each end thereof in said cigarette-rolling head is a plunger 76, pressed outwardly by a spiral spring 77, so that when the roll of tobacco is in the recess in the first step of the process of forming the cigarette the outer ends of the plungers will come into contact with the beveled ends 80 of the converging rails 79, force the plungers inwardly, as shown in Fig. 13, and compress and hold the ends of the roll of tobacco solid both before and after it has been wrapped. After the wrapping and rolling operation has been completed and just before the cigarette is about to leave the rolling-table 59 the ends of the plungers 76 pass beyond the beveled ends 81 of the rails 79, leaving the cigarette free to be discharged when the cigarette-rolling head of the carriage has arrived at the end 60 of the table. It will thus be seen that I preserve the roll cylindrical and compact both in its body and at its ends, thereby making a firm solid roll in the wrapper.

After the cigarette has been finished as far as above described and it has been discharged from the end 60 of the table it falls by gravity into a longitudinal semicircular recess 82 in the solid cylinder 83, and this cylinder is the exact length of a finished cigarette, and it is adjustably secured on a shaft 84, journaled in arms 85 on a bracket 86, secured to bracket 62 on the frame. One end of the shaft 84 is provided with a pinion 87 on the outside of the arm 85. Said cylinder 83 and pinion 87 are oscillated one-half of a revolution by a rack 88, reciprocating in a guide 89, secured to the bracket 62, and the forward end of said rack is connected to a cam 90 on the shaft 48 by a pitman 91, provided with a spring 92. The construction of said cam and pitman is the same as that described above for the cam 47 and pitman 45. The cylinder 83 is adjustably secured on its shaft 84 by a set-screw, (not shown,) and its periphery may be provided with a series of semicircular recesses 82' of different sizes to correspond to the diameter of different-sized cigarettes.

Mounted upon the shaft 93 and driven by a small pulley 94 and belt 95 from a larger pulley on the main shaft 48 is a pair of cutter-disks 96, revolving in the direction of the arrows, and they are so adjusted that their peripheral cutting edges overlap the recess 82 and barely clear the ends of the cylinder 83, and at the same moment the cigarette is dropped into the recess 82 the rack 88 is operated by its cam 90 to semirotate the cylinder 83, which carries recess 82 containing the cigarette, around, when its ends come in contact with the rapidly-revolving disks 96, which trim off the ends of the cigarette to a uniform and finished length, and the further rotation of the cylinder carries the recess 82 around and down into the position shown in dotted lines in Fig. 2. Here it drops by gravity upon an endless chain 97, traveling in a frame 101, secured to the bracket 86 and extending laterally at a right angle to the machine proper, in which it is driven by a sprocket-wheel 98 on a shaft 99, provided with an angle-gear 100, meshing with an intermediate gearing means driven by a bevel-gear on the main shaft 48.

Referring to Fig. 6, it will be seen that the shaft 99 extends through the frame 101, and its end is provided with a gear-wheel 102, which meshes with an idler 103, which rotates a pinion 104, secured to a roller 105 by a screw 106, so that the roller and attached pinion revolve freely in the frame 101. This description will answer for the series of rolls 105, which are driven in the same direction by the idlers 103 placed between them. It will be seen by reference to Fig. 6 that these rollers 105 each have a semicircular groove 107 in its periphery, so that after the finished cigarette is carried by the endless chain over the sprocket-wheel 98, at which point the chain returns, the cigarette is carried along and delivered to the rollers 105, it falling into the grooves 107. The cigarette is then carried forward until its further motion is arrested by its end coming in contact with the arm 108 on the frame 101. Immediately below these rollers 105 and at a right angle thereto is a second carrying-frame 109, which extends upwardly and terminates at a point near the front end of the machine and within convenient reach of the operator engaged in feeding the machine. This frame 109 supports an endless traveling belt 110, passing around friction-rollers 112 and 113, located in either end of said frame, and it is driven by one of said rollers and is provided on its face at suitable intervals with fingers or pins 114, which arise and pass between the rollers 105, engage the cigarette, and carry it along with them up the incline, when the cigarette is dropped in a box or receptacle placed there to receive it. The object of conveying the finished cigarette to this point is to allow the filled receptacle to be removed and an empty one substituted by the operator attending the machine, thus economizing the time of the attendant and requiring the services of only one person to each machine, a very important saving in time, labor, and expense in operating the machine.

Secured by bolts 115 to the rear end of the sides 2 and 3, near their tops, is a brace 116, the face of which is provided with an integral dovetail guide 117, upon which slides transversely a carriage 118, and this carriage is provided with a vertical integral dovetail guide 119, upon which slides a carrier-head 120, and a gib 121 in the guideway of the head 120 is adjusted by the set-screws 122, by means of which the head may be set the proper height, as will be explained hereinafter.

A longitudinal slot 123 in the brace 116 permits the passage of a stud-bolt 124, to the outer end of which is connected a pitman 125, passing through a circular opening 126 and having its free end connected to a cam-lever 127, pivoted to the frame at 128 and having a friction-roller 129 mounted thereon, which comes in contact with the face of a cam 130 on the shaft 99, which is operated by bevel-gears from the main shaft 48, as above explained.

Rigidly secured to the carriage-head 120 by screws is one arm 131 of the paper-carrying pincers, the free arm 132 of which is pivoted to the former by a bolt 133, its arm extending upwardly above the carriage, where it is bifurcated to receive a friction-roller 134. Secured to one side of the movable arm 132 is a rigid detent 135, V-shaped on its under side, which engages with a similarly-shaped detent 136, secured to the free end of a lever 137, pivoted to a lug 138 on the front face of the carrier-head 120 by a bolt 139, and the contacting V faces are held together by a leaf-spring 140, the free end of which presses against the bottom of the lever 137, the other end being secured to a screw-stud 141 on the face of the head 120, the tension of said spring being regulated by a thumb-screw 142, passing through a lug 143, integral with the face of the head 120.

The lower end of the rigid pincers-arm 131 extends below the carrier-head 120 and terminates in a stationary lower jaw 144, while the movable arm 132, which is pivoted to the former by the bolt 133, also extends downward and terminates in a finger 145, between which the end 146 of the paper-roll 147 passes. This movable finger 145 is operated to clamp, carry, and release the paper as follows: Upon the brace 116 are secured two upright brackets 148, in which is journaled a rock-shaft 149, and upon this shaft at one end of the stroke of the head 120 and at a point in the same plane is secured an arm 150, the inclined face of which projects above and over the periphery of the friction-roller 134 on the upper end of the movable arm 132. If now the rock-shaft 149 be oscillated to press the inclined face of the arm 150 against the friction-roller 134, the arm 132 will be thrown outward, which raises the finger 145 from contact with the jaw 144 at the same time the V-shaped face of the detent 135 presses against the near side of the V-shaped detent 136, forcing the lever 137 downward against the action of the spring 140 until the point of the detent 135 has passed the point of the detent 136. The spring then forces the arm 137 up, thereby throwing the arm 132 to its limit and raising the finger 145 to its full extent. In this condition the head is moved back to the other end of its stroke, where the friction-roller 134 then lies in the same plane with the beveled face of a depending lever 151, supported on the frame, and this lever 151 is connected to a lever 152 by a pitman 153 on the rock-shaft 149, and at this point the shaft 149 is turned to press the beveled face of the lever 151 against the opposite side of the roller 134, so as to force the arm 132 inward. This motion throws the detent 135 on the opposite side of the detent 136 on the lever 137, which closes the finger 145 on the jaw 144 and retains them in a closed position.

The roll of paper 147 is provided with a hollow cylindrical core 154, which is centered and mounted upon a series of screws 155, tapped in and radially adjustable on the solid cylinder 156, and each screw is provided with a milled collar 157 for convenience of adjustment, by means of which the reel of paper may be centered to run "true" on the cylinder 156, which is mounted on a shaft 158, journaled so as to run freely in a standard 159, mounted on a shelf 185'. The end of the strip of paper passes over a roller 160 on one side of the standard 159 and then in a straight line in the direction of the feed-rollers 161 and 162 and under the paste-roller 176, thence passing between the jaw 144 and finger 145. The feed-roller 161 is positively driven by a pinion 162ª on its shaft 163, which meshes with a similar pinion 164 on the shaft 165, which carries the lower feed-roller 162. The shaft 163 is journaled in a sleeve 166, which is adjustably held in place in the standard 167 by a set-screw 168, and the bearing for the shaft 163 in the sleeve 166 is eccentric with the periphery of the said sleeve, so that the upper roller may be adjusted with reference to the lower roller 162, as shown in Fig. 28.

A shaft 169, mounted in brackets 170 on center studs 171, carries two rigid arms 172, provided at their free ends with center screws 173, between which is mounted a shaft 174, provided with a pulley 175 and the paste-wheel 176, which is provided with a circumferential flange 191. A pair of arms 177 and 178 are likewise secured to the shaft 169 and extend in the opposite direction to those first mentioned, and the extremity of the arm 177 is provided with a pressure pad or finger 179 and at a proper interval will press the paper 147 against the bed-plate and hold it there temporarily for the purpose to be hereinafter mentioned.

The end of the other arm 178 is provided with a friction-roller 180, which comes in contact with and is operated by the cam 181 on the lower feed-roller shaft 165, so that one portion of the periphery of said cam will operate the arm 178 to raise or release the pressure-finger 179 from contact with the paper 147 and at the same time throw the wheel 176 and its flange 191, which carries the paste, downward upon and in contact with the edge of the strip of paper, while another portion of the periphery of said cam presses the finger 179 down upon the paper, holding it temporarily and at the same time raising the paste-wheel from contact with the paper.

Immediately above the paste-wheel is mounted a paste-reservoir 182, secured by lugs 183 upon a yoke 184, which in turn is secured to the paper-carrying bed 185. The upper face of this yoke 184 is provided with a dovetail recess 186, in which is adjustably secured a slide 187, operated by a milled head-screw 188 in a lug 189, cast on the yoke 184, and the bottom of the reservoir 182 is provided with a slot 190, into which the flanged periphery 191 of the paste-wheel 176 projects to receive its paste, and the amount of paste withdrawn by the flange can be regulated exactly by the adjustable slide 187, the paste in the reservoir 182 being of such a consistency that it will not run out during the slight downward movement of the paste-wheel. The arm 178 of the pasting device is operated by the cam 181, as above mentioned, and it is held in contact with and caused to follow the motion of the face of said cam by a spiral spring 192, one end of which is secured to said arm and the other to a suitable point on the frame.

The feed-rollers 161 and 162 have a portion 161' and 162' cut away, so that when the paste-roller 176 is up and the finger 179 down any "buckling" of the strip of paper 147 is prevented, as would be the case if the paper were continuously fed while the finger 179 was down upon the strip of paper, and the motion of the cam 181 of course is so timed that when the finger is down the cut-away portions 161' and 162' will be opposite to and parallel with each other, leaving the paper free.

The pulley 175 on the paste-wheel driving-shaft 174 is driven by a small belt 193, running over a larger pulley on the main driving-shaft 48, and the pinion 164 on the lower feed-roller 162 receives its motion from a wheel 194, operated through the medium of a series of idlers 195, driven by a gear 196 on shaft 99, as shown in Fig. 17.

Upon the shelf 185' is secured a knee 197, adjustable thereon by means of the slot 198 and set-screw 199, and to it is fastened the lower rigid blade 200 of a pair of shears by screws $a\ a$, the upper movable blade 201 being pivoted to the former on a rivet $b$ in the usual manner, and a C-shaped flat spring 202, having its ends secured to studs 203, serves to hold the movable blade down upon the latter except when raised as follows: As shown in Fig. 19, the upper or movable blade 201 is provided with an inclined surface 204, located on its under side. Located between its cutting edge and the pivot connecting it to its mate and in line with this inclined surface 204 is a friction-roller 205, mounted on the free end of a rocking lever 206, pivoted to a bracket on the frame at 207. To this lever 206 is connected a pitman 208, provided with a roller 209 on one side thereof, which is operated by a cam 210 on the shaft 211, having a pinion 212, driven through the medium of idlers from a gear-wheel on the main driving-shaft 48, and the operation of said cam 210 is such that when the finger 145 has closed to grasp the paper 147 the cam then operates the shears to sever the piece of paper the size of a cigarette-wrapper at a point between the pincers-finger and the paste-wheel. The carriage-head is then operated to carry the detached paper wrapper over and lay it on the rolling-table, where it is held until the apron carrying the roll of tobacco engages it.

The operation of the machine is as follows: Power being applied to the main driving-shaft 48, the attendant feeds the prepared tobacco to the feed-belt 10, allowing a certain predetermined amount to each space between the strips 12. The loose tobacco is conveyed to the picking-roller 26, being loosely packed thereon by the solid-pressure roller 28. It is then taken off the picking-roller 26 by the teeth on the picking-roller 31, when it is discharged by gravity on the belt 10 at a point immediately below said roller 31. The belt 10 carries it under the conveying-belt 25, lightly compressing it as it is carried forward and pushed over the shelf 32. The end of the tobacco is forced against the cutter-blade 33 to further slightly compress it in the direction of its travel. The cutter is then raised, a sufficient charge is fed out by the feed-belt 10 and compacting-belt 25, the blade descends, and the charge is severed from the main body of the tobacco, and the said charge falls into the pocket 34 in the apron 35. The cigarette-rolling head 73 is then forced rearward to close the pocket, and as its motion continues the charge is enveloped by the apron and the charge, with the apron surrounding it, forced into the rolling-recess 75 in the head 73. As soon as the cigarette-rolling head 73 has entered upon its journey along the cigarette-rolling table the levers 54, carrying the shaft 53, to which is secured the front end of the apron, are pressed forward, which takes up all the slack in the apron between the cigarette-rolling head 73 and the shaft 53. While this operation is going on, the shears have severed a piece of paper from the roll, with the paste on one edge of it, and it is caught by the finger 145 and jaw 144, and the carrier 120 carries it over and deposits it on the apron 35 about midway of its length on the cigarette-rolling table 59 with its free ungummed end toward the roll of tobacco in the cigarette-rolling head 73. The finger 145 holds it in this position until the cigarette-rolling head has engaged the wrapper and partially wrapped it around the roll of tobacco. At this moment the finger 145 releases the wrapper and the carrier 120 returns to its normal position, when a fresh section of gummed paper is fed between its jaws, which are then closed and the shears operated to sever the wrapper from the strip, and is ready to begin its trip over the cigarette-rolling table, as before described. While this operation is going on, the cigarette-rolling head 73 resumes its journey along the cigarette-rolling table 59, which causes the wrapper to completely envelop the roll of tobacco and press the meeting edge of the wrapper firmly down on the gummed edge thereof. The cigarette is then rolled over two or three times until it arrives at the end 60 of the cigarette-rolling table, where it falls over and into the recess 82 in the roller 83, which is then oscillated by the rack 88, which carries the cigarette between the revolving cutters 96, which trim off the ends of the cigarette to the proper length. The finished and complete cigarette then falls upon the endless chain belt 95, whence it is carried to the rollers 105, from which it is taken off by the pins 114 on the belt 110 and by it conveyed to a point within reach of the attendant, where it drops into a receptacle, which as soon as filled is removed and an empty one replaced by the attendant, as above described.

While I have described the means of carrying out my invention, it will be understood that various mechanical modifications may be made without departing from the spirit of the invention.

Having thus fully described my invention, what I claim, and desire to secure by Letters Patent, is—

1. A machine for making cigarettes, comprising an endless feed-belt, a series of picking-rollers located in the path of said belt, an endless compacting-belt located at an inclination above said feed-belt, a cutter-blade crossing the path of the tobacco, which abuts against said blade while it is being pressed by the feed and compacting belts, a pair of vertically-reciprocating arms carrying said cutter-blade and mounted in guide-brackets secured to the bed-plate, a transverse rod connecting the lower ends of said arms, a pair of levers having their free ends hinged to said transverse rod, and fulcrumed on a rock-shaft, a vertical lever likewise fulcrumed on said shaft, a connecting-rod, one end of which is pivoted to the free end of said vertical lever and having a friction-roller secured to one side of its opposite forked end, and a cam fixed on a driving-shaft and adapted to engage said forked end to impart an intermittent vertical reciprocating movement to said cutter-blade, substantially as and for the purpose set forth.

2. A machine for making cigarettes, comprising an endless feed-belt, an endless compacting-belt located at an inclination above said feed-belt, a series of picking-rollers located in the path of the feed-belt, a cutter-blade crossing the path of the tobacco, which abuts against said blade while it is being pressed by the feed and compacting belts, and means substantially as described for operating the same, in combination with a cigarette-rolling table, a rod mounted in the lower ends of a pair of oscillating levers fulcrumed in the frame of the machine, a roller-apron, one end of which is secured to said table and the other to the rod, a reciprocating carriage, a lever fulcrumed in the frame, a connecting-rod connecting the free end of said lever with said carriage, a cam mounted on the driving-shaft and in operative contact with said lever, the cigarette-rolling head of said carriage being formed with a recess adapted to engage a pocket in said roller-apron containing a charge of tobacco, and form the same into a roll during its passage across the cigarette-rolling table, as and for the purpose set forth.

3. A machine for making cigarettes, comprising a cigarette-rolling table, a pair of oscillating levers, a rod mounted in said levers, a rolling-apron connected at one end to the cigarette-rolling table and the other end to the rod, a reciprocating carriage having a cigarette-rolling head formed with a recess, plungers, a retractile spring located at each end of said recess in said head, and a pair of stationary converging rails located in the path of said head, as and for the purpose set forth.

4. In a cigarette-making machine, the combination with the conveying-cylinder, the rotating cutters and the conveyer-belt located in a frame immediately below said cylinder, a series of circumferentially-grooved feed-rollers journaled in said frame, and an arm against which one end of the finished cigarette abuts, of an upwardly-inclined elevator-belt provided with fingers adapted to take the finished cigarette from the feed-rollers, substantially as and for the purpose set forth.

5. In a cigarette-making machine, the cigarette forming and rolling devices substantially as described, in combination with a pair of continuously-operated feed-rollers, having oppositely-arranged cut-away portions, an intermittently-operated paste-wheel, adapted to travel to and from the paper, a traveling carriage having a stationary jaw and a movable finger adapted to clamp the paper against said jaw, and a paper-cutting device located between the paste-wheel and the clamping-finger, and adapted to sever a section of the pasted paper, as and for the purpose set forth.

6. In a cigarette-machine, the endless feed-belt provided with cross-strips, the stationary rollers and the adjustable tension-roller upon which said feed-belt is mounted, in combination with the compacting-belt mounted on rollers at an inclination to said endless feed-belt, the picking-rollers located in the path of the feed-belt, the cutter-blade crossing the path of the tobacco which abuts against said blade while it is being fed forward, the vertical reciprocating arms on which said blade is mounted, the driving-shaft and the cam mounted on said driving-shaft and adapted to intermittently operate said arms and cutter-blade, as and for the purpose set forth.

7. In a cigarette-making machine, a cigarette-forming device, consisting of the rolling-table 59, the apron 35, the oscillating arms 54, the rod 53 mounted in said arms, in combination with the carriage 67, the cigarette-rolling head 73, formed with a recess 75, spring-actuated plungers located in said cigarette-rolling head at each end of said recess, and a pair of inwardly-converging rails located in the path of said plungers, as and for the purpose set forth.

8. In a cigarette-machine having cigarette rolling, wrapping and trimming devices, substantially as described, the combination with the frame 101 extending at a right angle to the delivery end of the machine proper, the endless chain 97 mounted in said frame, the series of grooved rollers 105 journaled in the outer end of said frame, the inclined frame 109 located at a right angle to the frame 101 and extending upwardly and forwardly to a point within reach of the attendant at the front of the machine, the endless belt 110 provided with a series of fingers 114 and mounted in said inclined frame 109, substantially as and for the purpose set forth.

9. In a cigarette-making machine having a cigarette rolling and wrapping device substantially as described, the combination with a pair of continuously-operated paper-feed rollers having cut-away portions, the shaft 169, the arm 172, the paste-wheel 191 mounted in said arm, the pressure-finger 179 and arm 178 mounted on said shaft, a cam mounted on the shaft of one of said paper-feed rollers and adapted to cause the paste-wheel and pressure-finger to alternately travel to and from the paper, of the traveling carriage 120, the stationary jaw 144 and pivoted finger 145 mounted on said carriage, the lever 127, and the pitman 125 connecting said carriage and lever, the cam 130, and the shaft 99 on which said cam is mounted, and means substantially as described for operating the same, as set forth.

10. In a cigarette-making machine comprising the pair of continuously-operated feed-rollers, the paste-receptacle having an opening in its bottom, the arm 172, the paste-roller 191 mounted in said arm and adapted to travel from the opening in the bottom of the paste-receptacle to the paper on the bed of the machine, the arm 178 and the pressure-finger 179, the shaft 169 on which said arms and pressure-finger are mounted, a pair of feed-rollers having cut-away portions, the cam 181 mounted on the shaft of one of said feed-rollers, the stationary shear-blade 200, the blade 201 pivoted thereto, and the spring 202 connecting said blades, in combination with the lever 206, the roller 205 mounted in said lever, the pitman 208 connected to said lever, a counter-shaft and a cam mounted on said counter-shaft and adapted to operate the pivoted blade through the medium of said pitman and lever, substantially as and for the purpose set forth.

In testimony whereof I hereunto affix my signature in presence of two witnesses.

GEORGE H. HILGARTNER.

Witnesses:
A. B. SUIT,
SAML. A. DRURY.